United States Patent
Runkle et al.

(10) Patent No.: US 11,029,666 B2
(45) Date of Patent: Jun. 8, 2021

(54) FABRICATION OF PROCESS-EQUIVALENT TEST SPECIMENS OF ADDITIVELY MANUFACTURED COMPONENTS

(71) Applicant: United Technologies Corporation, Farmington, CT (US)

(72) Inventors: Rebecca L. Runkle, Manchester, CT (US); Anthony Patrick Ventura, South Glastonbury, CT (US); Thomas Anthony Rebbecchi, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 394 days.

(21) Appl. No.: 15/816,562

(22) Filed: Nov. 17, 2017

(65) Prior Publication Data

US 2019/0155254 A1 May 23, 2019

(51) Int. Cl.
| | |
|---|---|
| *G05B 19/4155* | (2006.01) |
| *B33Y 10/00* | (2015.01) |
| *B33Y 50/02* | (2015.01) |
| *G06F 30/17* | (2020.01) |
| *B22F 10/20* | (2021.01) |

(Continued)

(52) U.S. Cl.
CPC ......... *G05B 19/4155* (2013.01); *B22F 10/20* (2021.01); *B33Y 10/00* (2014.12); *B33Y 50/02* (2014.12); *G06F 30/17* (2020.01); *B22F 10/30* (2021.01); *G05B 2219/31372* (2013.01); *G05B 2219/49018* (2013.01); *G06F 2119/08* (2020.01)

(58) Field of Classification Search
CPC ...... G05B 19/4155; G05B 2219/49018; G05B 2219/31372; B22F 3/1055; B33Y 50/02; B33Y 10/00; G06F 17/5086; G06F 2217/80

See application file for complete search history.

(56) References Cited

U.S. PATENT DOCUMENTS

| 8,501,075 B2 | 8/2013 | Philippi et al. |
| 9,347,898 B1 * | 5/2016 | Smith ............... G01N 25/18 |

(Continued)

FOREIGN PATENT DOCUMENTS

WO    WO2016/201390 A1    12/2016

OTHER PUBLICATIONS

Kelly et al, "A Thermal and Microstructuremodel for Laser Deposition of TI-6AL-4V", 2004, pp. 8, downloaded from the internet at https://pdfs.semanticscholar.org/8d3d/97ac3069c5dba337b6d74f95acac7dbd560a.pdf?_ga=2.136691128.903375176.1575852030-1640360226.1551326499. (Year: 2004).*

Smith et al, "Linking process, structure, property, and performance for metal-based additive manufacturing: computational approaches with experimental support", Jan. 5, 2016, pp. 583-610 downloaded from the internet at https://link.springer.com/content/pdf/10.1007%2Fs00466-015-1240-4.pdf. (Year: 2016).*

(Continued)

*Primary Examiner* — Rocio Del Mar Perez-Velez
*Assistant Examiner* — Olvin Lopez Alvarez
(74) *Attorney, Agent, or Firm* — Kinney & Lange, P.A.

(57) ABSTRACT

A method of fabricating process-equivalent test specimens to an additively manufactured component includes generating a processing history model of a component, dividing the component into regions based on input data variations in processing history, wherein each region is characterized by an identified range of input data, determining additive manufacturing processing parameters needed to additively manufacture one or more test specimens that each mimic the processing history in one of the regions, and fabricating the one or more test specimens using the processing parameters determined.

13 Claims, 3 Drawing Sheets

(51) Int. Cl.
*G06F 119/08* (2020.01)
*B22F 10/30* (2021.01)

(56) References Cited

U.S. PATENT DOCUMENTS

| | | | |
|---|---|---|---|
| 9,764,517 B2 | 9/2017 | Potter | |
| 2004/0254665 A1* | 12/2004 | Fink | B29C 64/153 |
| | | | 700/98 |
| 2005/0038817 A1* | 2/2005 | Huang | G06T 7/0006 |
| 2007/0119528 A1* | 5/2007 | Malley | C22C 19/056 |
| | | | 148/675 |
| 2010/0174392 A1* | 7/2010 | Fink | B33Y 10/00 |
| | | | 700/104 |
| 2012/0232685 A1* | 9/2012 | Wang | B22D 46/00 |
| | | | 700/98 |
| 2014/0090753 A1* | 4/2014 | Vargas | C21D 11/00 |
| | | | 148/508 |
| 2014/0159266 A1 | 6/2014 | Bamberg et al. | |
| 2015/0336331 A1* | 11/2015 | Potter | G01N 23/046 |
| | | | 264/40.1 |
| 2016/0224017 A1* | 8/2016 | Huang | B22F 3/1055 |
| 2017/0001243 A1* | 1/2017 | Hayano | B22F 3/1055 |
| 2017/0090462 A1 | 3/2017 | Dave et al. | |
| 2017/0232517 A1* | 8/2017 | Morton | B22F 3/1055 |
| | | | 419/29 |
| 2018/0001570 A1* | 1/2018 | Cahn | B33Y 50/00 |
| 2018/0052445 A1* | 2/2018 | Shapiro | G05B 19/4099 |
| 2018/0169948 A1* | 6/2018 | Coeck | B33Y 50/02 |
| 2018/0193954 A1* | 7/2018 | Yuan | B22F 10/20 |
| 2018/0304359 A1* | 10/2018 | Gibson | B29C 64/00 |
| 2019/0001574 A1* | 1/2019 | Yackabonis | G06F 3/1206 |
| 2019/0004496 A1* | 1/2019 | Blom | B33Y 50/00 |
| 2019/0039318 A1* | 2/2019 | Madigan | B23K 26/032 |
| 2019/0054702 A1* | 2/2019 | Hartman | B29C 64/393 |
| 2019/0118300 A1* | 4/2019 | Penny | B23K 26/032 |
| 2019/0118480 A1* | 4/2019 | Abello Rosello | B29C 64/386 |
| 2019/0126549 A1* | 5/2019 | Esquius | B33Y 30/00 |
| 2019/0134754 A1* | 5/2019 | Jacquemetton | B23K 26/032 |
| 2019/0210353 A1* | 7/2019 | Dave | B33Y 30/00 |
| 2019/0283135 A1* | 9/2019 | Hu | C04B 35/6261 |
| 2019/0354651 A1* | 11/2019 | Balandier | G05B 19/4099 |

OTHER PUBLICATIONS

Extended European Search Report for EP Application No. 18207115.9, dated May 7, 2019, 20 pages.
Z. Wang et al, "Effect of processing parameters on microstructure and tensile properties of austenitic stainless steel 304L made by directed energy deposition additive manufacturing", from Acta Materialia 110 (2016) pp. 226-235.
J. Keist et al., "Role of geometry on properties of additively manufactured ti-6A1-4V structures fabricated using laser based directed energy deposition", from Materials and Design 106 (2016) pp. 482-494.
T. Wang, et al., "Microstructure and properties of die steel fabricated by WAAM using H13 Wire", from Vacuum 149 (2018) pp. 185-189.
T. Craeghs et al., "Determination of Geometrical Factors in Layerwise Laser Melting Using Optical Process Monitoring", from Optics and Lasers in Engineering 49 (2011) pp. 1440-1446.
T. Craeghs et al., "Detection of Process Failures in Layerwise Laser Melting with Optical Process Monitoring", from Physics Procedia 39 (2012) pp. 753-759.
A. Elwany et al., "A Review on Process Monitoring and Control in Metal-Based Additive Manufacturing", from Journal of Manufacturing Science and Engineering, vol. 136, Dec. 2014, 11 pages.
J. Bamberg et al., "In-Process Control of Selective Laser Melting by Quantitative Optical Tomography", from 19th World Conference on Non-Destructive Testing, 2016, 8 pages.
R. Smith, et al., "Spatially Resolved Acoustic Spectroscopy for Selective Laser Melting", from Journal of Materials Processing Technology 236 (2016), pp. 93-102.
M. Abdelrahman, et al., "Flaw Detection in Powder Bed Fusion Using Optical Imaging", from Additive Manufacturing 15 (2017) pp. 1-11.
G. Repossini et al., "On the Use of Spatter Signature for In-Situ Monitoring of Laser Powder Bed Fusion", from Additive Manufacturing 16 (2017) pp. 35-48.
B. Yao et al., "Multifractal Analysis of Image Profiles for the Characterization and Detection of Defects in Additive Manufacturing", 2017, pp. 1-21.

* cited by examiner

FABRICATION OF PROCESS-EQUIVALENT TEST SPECIMENS OF ADDITIVELY MANUFACTURED COMPONENTS

BACKGROUND

The present invention relates generally to additive manufacturing and, more particularly, to the fabrication of test specimens for evaluating additively manufactured components.

Powder bed fusion additive manufacturing processes are capable of manufacturing aerospace components and assemblies. However, due to limited understanding of critical-to-quality input parameters and uncontrolled variation in material processing during fabrication, material property scatter can be observed. This is particularly true in components with complex geometries. The processing history of the material in additively manufactured components can vary within a component due to variations in component geometry. For example, thin areas of the component can be subjected to higher processing temperatures than thick areas, which can result in wide differences in material properties from one region of the component to another. While the development of processing sensors and additive manufacturing modeling has provided engineers with a deeper understanding of how thermal history varies based on the geometry of the component, this development has not been effectively leveraged to improve the fidelity of material property data for additively manufactured components via localized characterization of material properties. Instead, material properties of components have conventionally been assessed using test specimens fabricated using nominal processing parameters purported to provide an average representation of the material properties of the component as a whole. This, however, can be inadequate for effective part qualification as it fails to identify regions or locations of the component where, due to variations in processing history, material properties do not meet part qualification standards.

SUMMARY

In one instance, a method of fabricating process-equivalent test specimens for an additively manufactured component includes generating a processing history model of a component, dividing the component into regions based on input data variations in processing history, wherein each region is characterized by an identified range of input data, determining additive manufacturing processing parameters needed to additively manufacture one or more test specimens that each mimic the processing history in one of the regions, and fabricating the one or more test specimens using the processing parameters determined.

In another aspect, an additive manufacturing system for fabricating test specimens includes an additive manufacturing machine for fabricating a component and test specimens, a sensor for detecting in-situ sensed data throughout a build process, and a processor that performs steps to produce a machine processing routine used to fabricate a test specimen that mimic the processing history of the first identified region of the component. The processor performs the steps of generating a processing history model of the component wherein input data comprising in-situ sensor data and/or processing metrics is mapped to the component geometry, and using the input data from a first identified region of the component to produce a transfer function that translates the input data obtained from the first identified region of the component to the machine processing routine. The processing metrics are derived from the in-situ sensor data or a computational model of an additive manufacturing process of the component.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Processing history, including, for example a thermal history (i.e., maximum temperature reached at each location of the component throughout the build process and cooling rate from that temperature), impacts the microstructure of a component made using additive manufacturing and defines the material properties of the component. Components with complex geometries can have complex processing or thermal histories (e.g., thin regions can be exposed to more heat during fabrication than thicker regions), which can result in variations in material properties throughout the component. The variation in processing histories throughout an additively manufactured component can result from both direct and indirect changes to processing parameters or variables. Direct variables can include, but are not limited to, laser power, laser speed, hatch distance, layer thickness, beam offset, and beam focus. Indirect variables can include, but are not limited to, changes in geometry that affect thermal behavior (i.e., localized cooling rate), stochastic variations that affect thermal behavior and/or build material application, and interruptions in the fabrication process. Developments in processing sensors and additive manufacturing modeling has provided engineers with a deeper understanding of how processing history varies based on the geometry of the component. In-situ sensor data and processing metrics can be obtained throughout an additive manufacturing build process to identify regions or locations of the additively manufactured component having off-nominal or characteristic processing histories.

Despite the ability to identify variations in processing histories and thereby material properties throughout a component, conventional material characterization of additively manufactured components utilizes test specimens that are wholly fabricated using nominal processing parameters or variables with the directive to emulate the average metallurgical state of the material that makes up the component. The present application discloses a method of fabricating test specimens that emulate the processed (and thus metallurgical) state of identified regions or locations of the component having a characteristic processing history. Spatially resolved sensor data and/or processing metrics can be translated to a machine processing routine used to fabricate test specimens that are process equivalent to the regions identified. Non-destructive and destructive analysis of the process-equivalent test specimens can then be conducted to determine the material properties of each of the regions of the component. The spatial resolution of material properties provides a more comprehensive assessment of the component as a whole and can be used to more effectively qualify the part or part family (components of similar geometry and made by a similar process) for a particular application.

It will be understood by one of ordinary skill in the art that the "component" as disclosed herein can be any geometry and that neither the component nor the method disclosed herein are limited to aerospace applications. Furthermore, while the present application discloses the use of a photodiode sensor for detecting thermal conditions throughout the build process, it is anticipated that the method disclosed could benefit from additional processing inputs provided with the advancement of sensor technology. For example, chemical composition, powder bed density, and particle size or size distribution can contribute to variations in material properties and additional inputs relating to this information could be useful in certain applications. As used herein, "metallurgically-equivalent" refers to an additively manufactured test specimen having material properties that are substantially equivalent to the material properties of at least a portion of an additively manufactured component. Material properties can include yield strength, tensile strength, ductility, toughness, hardness, resistance to corrosion, fatigue life, microstructure and features thereof, porosity, metallurgical inclusions, crystalline orientation, surface finish, and other quantifiable material properties as known in the art. The term "process-equivalent" refers to an additive manufactured test specimen having a processing history that is substantially equivalent to a processing history of at least a portion of the additively manufactured component. As discussed further, in some embodiments, additive manufacturing of the test specimens and the component can be simulated and a process history can be derived from the simulation as opposed to data collected during fabrication. Process-equivalent test specimens and component regions denotes metallurgical equivalency.

Figure 1:
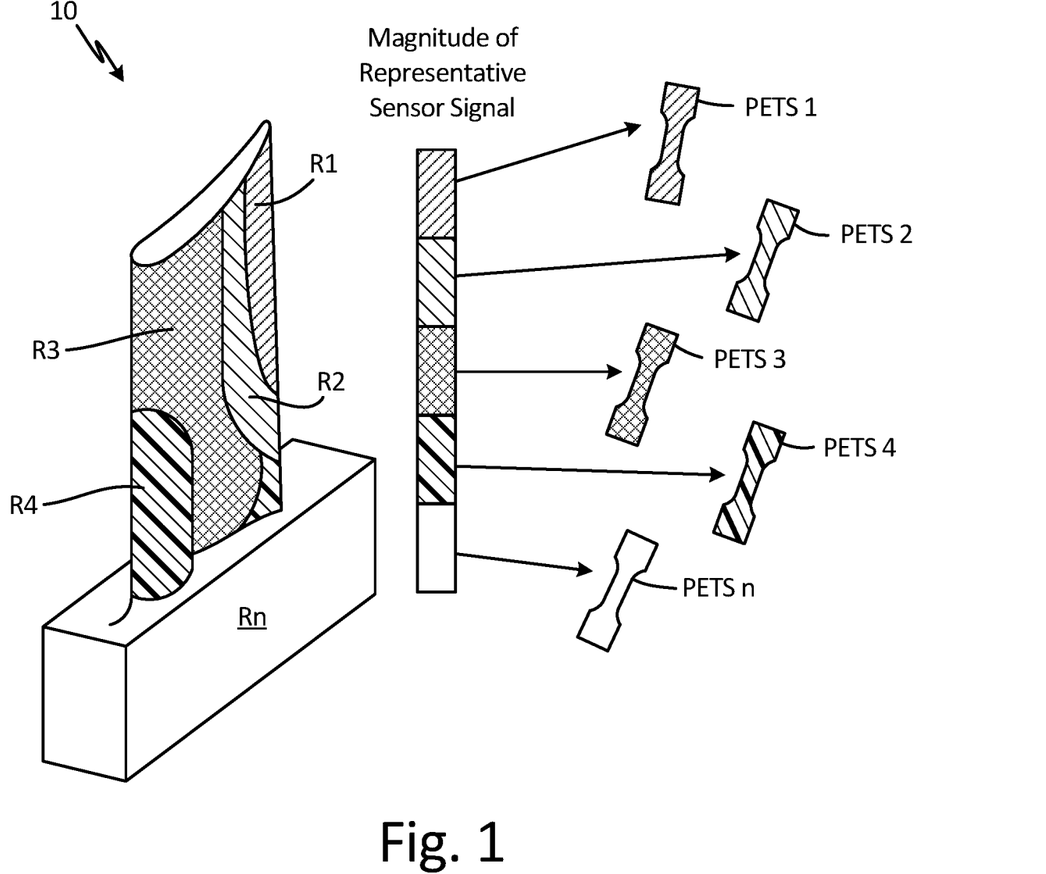
FIG. 1 is a schematic drawing of a component fabricated using additive manufacturing with sensor data obtained during fabrication mapped onto the component and process-equivalent test specimens fabricated corresponding to different regions of interest of the component.
Figure 2:
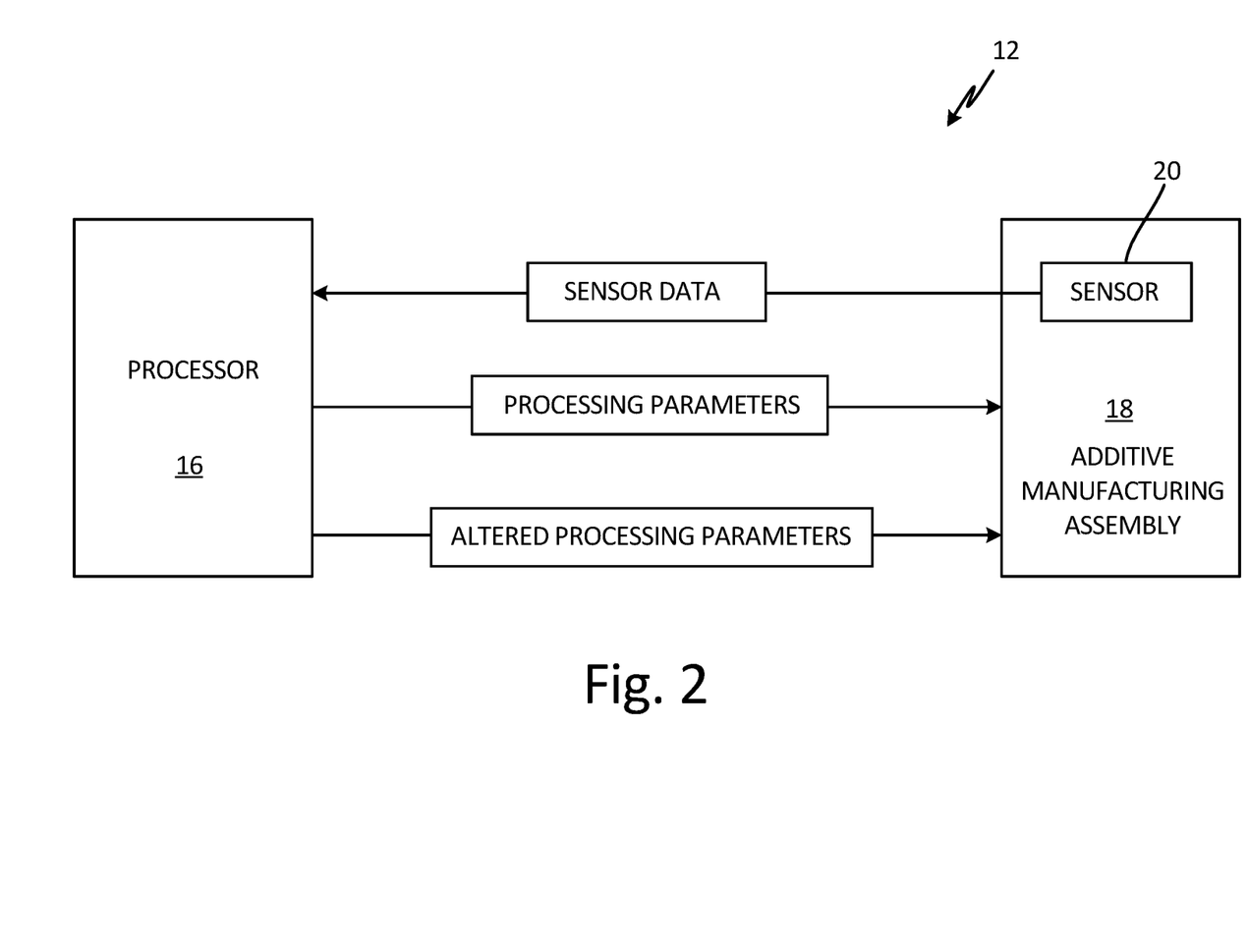
FIG. 2 is a schematic of an additive manufacturing system for fabricating test specimens.
Figure 3:
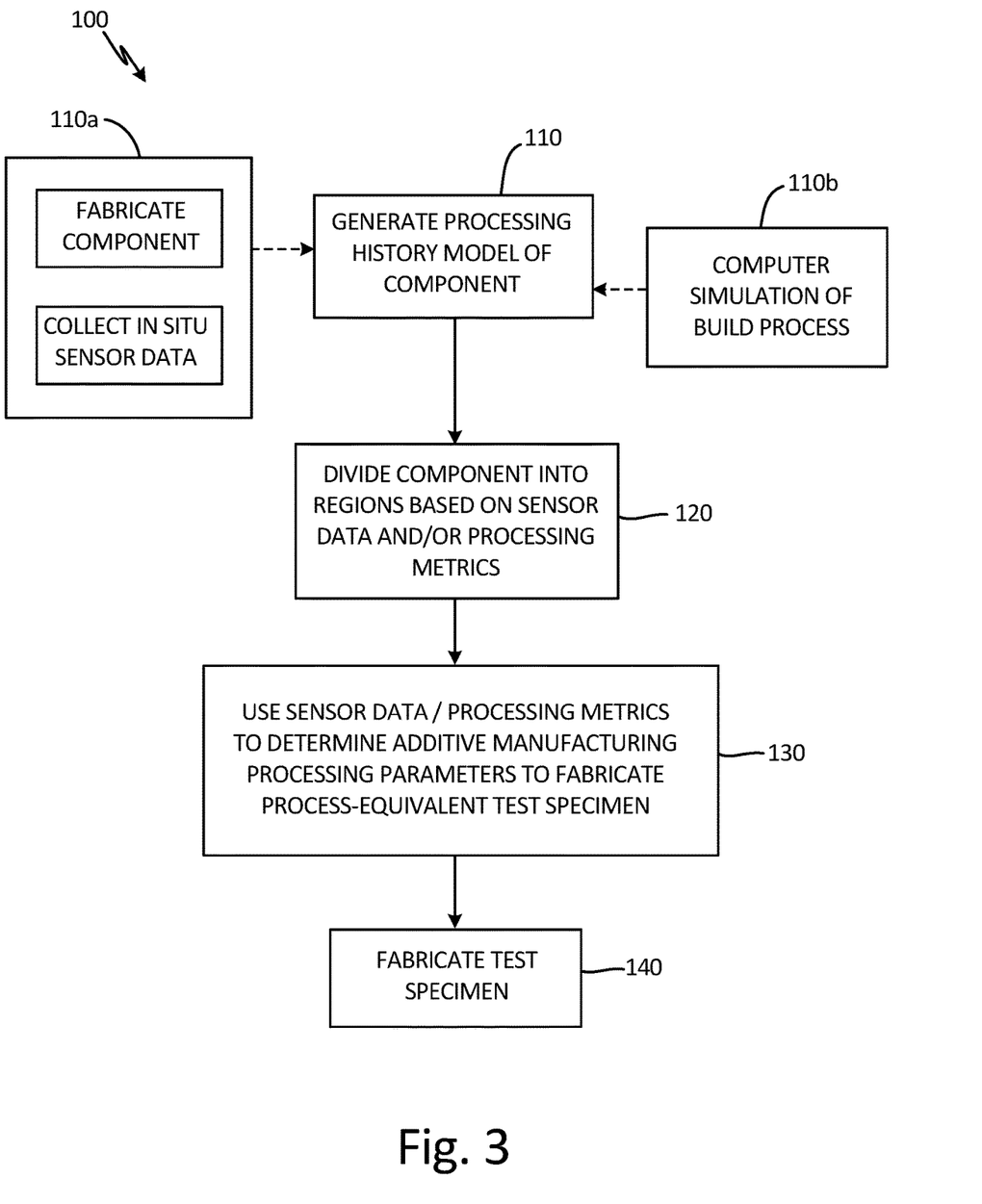
FIG. 3 is a diagram of a process for fabricating process-equivalent test specimens to an additively manufactured component.

FIG. 1 is a schematic drawing of component 10 with regions R1 through Rn characterized by non-overlapping ranges of sensor data and/or processing metrics obtained from the additive manufacturing processing history, and process-equivalent test specimens PETS1 through PETSn corresponding to regions R1 through Rn. FIG. 2 shows the additive manufacturing system 12 used to fabricate test specimens PETS1 through PETSn, including processor 16 and additive manufacturing assembly 18 equipped with sensor 20. FIG. 3 is a diagram of process 100 for fabricating PETS1 through PETSn.

A processing history model of component 10, as shown in FIG. 1, can be generated empirically through component fabrication and in-situ data collection or by computational modeling of an additively manufacturing process (FIG. 3, steps 110, 110a, and 110b). Component 10 can be fabricated using laser powder bed fusion additive manufacturing, including but not limited to direct metal laser sintering (DMLS), electron beam melting (EBM), and selective laser melting (SLM), as known in the art. Powder bed fusion processes use lasers or electron beams to fuse powdered material in a layer-by-layer process. Additive manufacturing assembly 18, as shown in FIG. 2, is a conventional powder bed fusion assembly equipped with sensor 20 for obtaining in-situ sensor data throughout the build process for each build layer. Although the method disclosed herein is directed to the fabrication of metal components by laser powder bed fusion, it may be adapted for use in other additive manufacturing processes.

Sensor 20 can be any type of sensor capable of providing processing history data necessary for the identification of regions or locations on component 10 having material properties that are different than the material properties of adjacent regions or locations. For example, sensor 20 can be an emission detection sensor provided with an additive manufacturing machine and capable of detecting thermal conditions of component 10 throughout the build process (FIG. 3, step 120). As previously discussed, the thermal history (i.e., maximum temperature reached at each location of the component during the build process and cooling rate from that temperature) governs the microstructure and can define the material properties of component 10 at that location. Sensor signals can be detected at all locations of a geometrical shape of component 10 for each build layer thereby capturing the relative temperature at all three-dimensional locations of component 10. In some embodiments, sensor 20 can directly or indirectly measure the temperature in the melt pool where the laser is focused. In one embodiment, sensor 20 can be a photodiode sensor, which can convert radiation emitted during the build process to voltage signals at a rate of up to 60,000 points per second. In this manner, sensor 20 can provide a detailed thermal history of component 10, allowing users to assess relative temperature throughout component 10 and identify accumulated hot or cool spots on and within component 10, which can indicate a change in material properties relative to other regions or locations of component 10.

In some embodiments, multiple sensors 20 can be used to simultaneously capture data at multiple locations of the component during fabrication or to capture different types of data that can be used in generating the processing history of the component. In some embodiments, multiple types of thermal imaging or emissions sensors can be used as a means of data verification. In other embodiments, sensors 20 can detect different properties (e.g., chemistry, powder bed density, etc.), which can provide additional information that can be informative of the material properties of that location. Processing history metrics can be derived from the compilation of sensor data and can be the input data used to determine additive manufacturing processing parameters needed to additively manufacture the process-equivalent test specimens PETS1 through PETSn.

In some embodiments, the design of the process-equivalent test specimens PETS1 through PETSn can be entirely empirically driven, complemented by process models. Alternatively, once the models have been calibrated, the design of process-equivalent test specimens PETS1 through PETSn can be entirely model driven (e.g., a thermal model can be used to simulate component 10 and design test specimens all before the first component build). In this instance, data/geometry inputs are processing metrics as opposed to in-situ sensor data collected during the build process.

Processor 16 can obtain input data, which, as used herein, can include sensor signals from in-situ sensor 20 and/or processing history metrics derived from in-situ sensor data or the computational model of the additive manufacturing processes. Processor 16 can spatially resolve input data (e.g., relative temperature) or map input data to locations in the three-dimensional geometry of component 10 (FIG. 3, step 110). Processor 16 can divide component 10 into regions of interest R1 through Rn (FIG. 1) based on the input data collected (FIG. 3, step 120). Each region can be characterized by a unique range of input data values with adjacent regions R1 through Rn characterized by non-overlapping ranges of input data. Component 10 can be divided into any number of regions R1 through Rn and each of the regions R1 through Rn can be noncontiguous (e.g., component 10 can have multiple non-adjacent regions R1 characterized by the same unique range of input data). In some embodiments, component 10 can be divided into two regions R1 and R2, in which one of the regions R1 and R2 is characterized by a relatively high or low thermal signal. In other embodiments, three or more regions R1 through Rn may be identified. The process of dividing component 10 into regions R1 through Rn can be dependent on the variation of relative temperature in component 10, which can be governed, at least in part, by component geometry. Additionally, the identification of regions R1 through Rn can be driven by performance requirements or the particular application in which component 10 will be used (e.g., some components may have features that require particular material properties, whereas, there may be greater tolerance for variation in material properties of other features of the same component). It will be understood by one of ordinary skill in the art that component 10 should be divided into as many regions R1 through Rn as necessary to effectively assess material properties of component 10 for the intended application.

In general, component 10 can be divided into regions R1 through Rn in which at least one region R1 through Rn has a low range of input data, where all of the input data values are below an identified maximum threshold and indicative of a relatively low sensor signal during processing, or a high range of input data, where all of the input data values are above an identified maximum threshold and indicative of a relatively high sensor signal during processing. In some embodiments, component 10 can be divided into three or more regions R1 through Rn, including a region having a low range of input data, a region having a high range of input data, and one or more regions having an intermediate range of input data between the minimum and maximum thresholds.

Once component 10 has been divided into regions R1 through Rn, processor 16 can determine additive manufacturing processing parameters needed to additively manufacture test specimens that mimic the processing history in at least some of the identified regions (FIG. 3, step 130). Processor 16 can use the input data, including in-situ sensor data (sensor signals) detected or communicated by sensor 20. In-situ sensor data can be used alone or in combination with processing metrics derived from the in-situ sensor data and/or derived from computational models of the additive manufacturing process to produce a transfer function that translates the input data from a selected region R1 through Rn to a to a machine processing routine used to fabricate a process-equivalent test specimen PETS1 through PETSn. Processor 16 can specify alterations to be made to the controlled processing parameters or variables (e.g., laser power, laser speed, hatch distance, layer thickness, beam offset, beam focus, specimen geometry, etc.) used to fabricate component 10 to produce process-equivalent test specimens PETS1 through PETSn exhibiting processing histories that mimic the processing histories of the regions R1 through Rn to which PETS1 through PETSn correspond. Different alterations to the controlled processing parameters or variables can be made for fabrication of each process-equivalent test specimens PETS1 through PETSn, as required to account for unique processing histories in each region R1 through Rn. Depending on the range of input data (e.g., variation in temperatures and cooling rates) within each region R1 through Rn, the output-altered processing parameters may be calculated to produce a test specimen with a processing history representative of an average processing history of the identified region R1 through Rn. To produce test specimens that are true process equivalents (and thereby metallurgical equivalents) of regions R1 through Rn, regions R1 through Rn should be characterized by a narrow range of input data, as will be understood by one of ordinary skill in the art. Material testing can be conducted to determine what degree of variation in input data results in significant differences in material properties.

Test specimens PETS1 through PETSn can be fabricated in the same fashion as component 10 using additive manufacturing assembly 18 and the output-altered processing parameters provided by processor 16 (FIG. 3, step 140). Process-equivalent test specimens PETS1 through PETSn can be fabricated in a manner that provides a generally uniform processing history (e.g., thermal history) throughout the three-dimensional geometry of the specimen thereby forming process-equivalent test specimens PETS1 through PETSn that are monolithic in character including metallurgical properties. Process-equivalent test specimens PETS1 through PETSn can have a different shape than component 10. In some embodiments, PETS1 through PETSn can have a cylindrical shape suitable for material property testing. In some embodiments, sensor 20 can be used to collect in-situ sensor data throughout the build process to construct the processing history of the test specimen. Provided the output-altered processing parameters have been correctly calculated, the processing history of the test specimen will substantially mimic the processing history of the region R1 through Rn from which the processing parameters were derived. Because the processing history generally governs the material properties, the material properties of the test specimen will substantially match the material properties of the region R1 through Rn thereby forming both process-equivalent and metallurgically-equivalent test specimens. In some embodiments, a computer simulation of the fabrication of process-equivalent test specimens PETS1 through PETSn can be used to generate a simulated processing history, which can be used to assess the quality of the output-altered processing parameters determined. After calibration, this model can be standalone in generating the altered processing parameters needed to fabricate process-equivalent test specimens PETS1 through PETSn.

Once process-equivalent test specimens PETS1 through PETSn are fabricated, they can undergo a series of destructive and/or non-destructive testing to assess the material properties of the specimen. Material properties evaluated can include yield strength, tensile strength, ductility, toughness, hardness, resistance to corrosion, fatigue life, porosity, metallurgical inclusions, crystalline orientation, and other quantifiable material or microstructural properties as known in the art. Material properties determined for each of the process-equivalent test species PETS1 through PETSn can be mapped to corresponding regions R1 through Rn to provide a holistic characterization of component 10 for component qualification as well as provide information that can be used to optimize the fabrication of component 10.

The utilization of component-specific sensor data and/or processing metrics derived from computational models to produce test specimens that represent the range of material processing history present in the actual component can provide a quantitative understanding of the material properties throughout the component and can allow for a more robust qualification of additively manufactured parts as well as optimization of design of additively manufactured parts.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A method of fabricating process-equivalent test specimens to an additively manufactured component includes generating a processing history model of a component, dividing the component into regions based on input data variations in processing history, wherein each region is characterized by an identified range of input data, determining additive manufacturing processing parameters needed to additively manufacture test specimens that mimic the processing history in at least one of the regions and fabricating test specimens using the processing parameters determined, wherein each test specimen corresponds to one of the selected regions of the component.

The method of the preceding paragraph can optionally include, additionally and/or alternatively, any one or more of the following features, configurations and/or additional components:

The method of the preceding paragraph, wherein generating a processing history model of a component can include simulating a build process of the component and wherein input data can include processing history metrics derived from a computational model of the additive manufacturing process.

The method of any of the preceding paragraphs, wherein generating a processing history model of a component can include fabricating the component using an additive manufacturing build process, collecting in-situ sensor data throughout the build process to construct the processing history of the component, and mapping the in-situ sensor data and/or processing history metrics derived from the in-situ sensor data to locations in the component geometry. The in-situ sensor data and the processing history metrics derived from the in-situ sensor data are the input data.

The method of any of the preceding paragraphs, wherein the in-situ sensor data can include sensor signals detected across a component geometry for each of a plurality of build layers.

The method of any of the preceding paragraphs, wherein the ranges of input data can be non-overlapping.

The method of any of the preceding paragraphs, wherein the processing parameters needed to additively manufacture the one or more test specimens can be determined for a region having a low range of input data, where all of values of the input data are below an identified maximum threshold, and a region having a high range of input data, where all values of the input data are above an identified minimum threshold.

The method of any of the preceding paragraphs, wherein the processing parameters needed to additively manufacture the one or more test specimens can be determined for a region having an intermediate range of input data, where the range input data is between the minimum and maximum thresholds.

The method of any of the preceding paragraphs, wherein determining additive manufacturing processing parameters can include using the input data to produce a transfer function that translates input data from a selected region to a machine processing routine used to fabricate a one of the test specimens corresponding to the selected region of the component.

The method of any of the preceding paragraphs, wherein processing parameters used for fabricating the component can be different than processing parameters used to fabricate at least one of the test specimens.

The method of any of the preceding paragraphs can further include collecting in-situ sensor data throughout the fabrication of each of the one or more test specimens to construct a processing history for each of the one or more test specimens. The processing history of each of the one or more test specimens is generally uniform throughout each of the one or more test specimens, and each test specimen has a processing history substantially mimicking the processing history of a selected region of the component.

The method of any of the preceding paragraphs, wherein the processing history can include a thermal history.

The method of any of the preceding paragraphs, wherein the component and the one or more test specimens can be fabricated using a powder bed fusion process, wherein the powder comprises a metal.

The method of any of the preceding paragraphs, wherein the one or more test specimens can be used to qualify the component for use.

An additive manufacturing system for fabricating test specimens includes an additive manufacturing machine for fabricating a component and test specimens, a sensor for detecting in-situ sensed data throughout a build process, and a processor that performs steps to produce a machine processing routine used to fabricate at test specimen that mimics the processing history of the first identified region of the component. The processor performs the steps of generating a processing history model of the component wherein input data comprising in-situ sensor data and/or processing metrics is mapped to the component geometry, and using the input data from a first identified region of the component to produce a transfer function that translates the input data obtained from the first identified region of the component to the machine processing routine. The processing metrics are derived from the in-situ sensor data or a computational model of an additive manufacturing process of the component.

The additive manufacturing system of the preceding paragraph can optionally include, additionally and/or alternatively, any one or more of the following features, configurations and/or additional components:

The additive manufacturing system of the preceding paragraph, wherein in-situ sensor data can include sensor signals detected across a component geometry for each of a plurality of build layers.

The additive manufacturing system of any of the preceding paragraphs, wherein the sensor can detect thermal conditions of the component within each of a plurality of build layers.

The additive manufacturing system of any of the preceding paragraphs, wherein input data of the identified region can indicate a hot region relative to other regions of the component.

The additive manufacturing system of any of the preceding paragraphs, wherein input data of the identified region can indicate a cool region relative to other regions of the component.

The additive manufacturing system of any of the preceding paragraphs, wherein the input data obtained from the first identified region can include a range of input data values that is different from a range of input data values in an adjacent region.

The additive manufacturing system of any of the preceding paragraphs, wherein the processor can use the input data from a second identified region of the component geometry to produce a transfer function that translates the input data to a machine processing routine used to fabricate test specimens that mimic the processing history of the second identified region of the component.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating process-equivalent test specimens of an additively manufactured component, the method comprising:
   generating a processing history model of a component, wherein the processing history model comprises a thermal history model of the component;
   dividing the processing history model of the component into a plurality of regions based on input data variations in processing history, wherein each region of the plurality of regions is characterized by an identified range of input data, the input data including thermal conditions of the component within each of a plurality of build layers;
   determining test specimen additive manufacturing processing parameters needed to additively manufacture a plurality of test specimens such that each test specimen of the plurality of test specimens has a processing history that matches a processing history of a respective region of the plurality of regions sufficiently that the test specimen and the respective region are metallurgically equivalent, wherein the additive manufacturing processing parameters comprise laser power, laser speed, hatch distance, layer thickness, beam offset, and beam focus; and
   fabricating the plurality of test specimens using the test specimen additive manufacturing processing parameters determined, wherein the test specimen additive manufacturing processing parameters are different than processing parameters used to fabricate the component.

2. The method of claim 1, wherein generating a processing history model of a component comprises simulating a build process of the component and wherein input data comprises processing history metrics derived from a computational model of the additive manufacturing process.

3. The method of claim 1, wherein generating a processing history model of a component comprises:
   fabricating the component using an additive manufacturing build process;
   collecting in-situ sensor data throughout the build process to construct the processing history of the component; and
   mapping the in-situ sensor data and/or processing history metrics derived from the in-situ sensor data to locations in the component geometry, wherein the in-situ sensor data and the processing history metrics derived from the in-situ sensor data are the input data.

4. The method of claim 3, wherein the in-situ sensor data comprises sensor signals detected across a component geometry for each of a plurality of build layers.

5. The method of claim 1, wherein the ranges of input data are non-overlapping.

6. The method of claim 1, wherein the plurality of test specimens includes a first test specimen and a second test specimen and wherein processing parameters needed to additively manufacture the first test specimen are determined for a first region having a low range of input data, wherein all of values of the input data of the first region are below an identified maximum value; and wherein processing parameters needed to additively manufacture the second test specimen are determined for a second region having a high range of input data, wherein all values of the input data of the second region are above an identified minimum value.

7. The method of claim 6, wherein the plurality of test specimens includes a third test specimen and wherein the processing parameters needed to additively manufacture the third test specimen are determined for a third region having an intermediate range of input data, wherein the intermediate range of input data is between the minimum and maximum values.

8. The method of claim 1 and further comprising:
   collecting in-situ sensor data throughout the fabrication of each test specimen of the plurality of test specimens to construct the processing history for each test specimen;
   wherein the processing history of each test specimen specimens is generally uniform throughout each test specimen;
   wherein each test specimen has a processing history metallurgically equivalent to the processing history of a selected region of the component.

9. The method of claim 1, wherein the component and the plurality of test specimens are fabricated using a powder bed fusion process, wherein the powder comprises a metal.

10. An additive manufacturing system for fabricating test specimens, the system comprising:
    an additive manufacturing machine for fabricating a component and separate test specimens;
    a sensor for detecting in-situ sensed data throughout a build process;

a processor that performs the steps of:

generating a processing history model of a component geometry, wherein input data comprising in-situ sensor data and/or processing metrics is mapped to the component, the input data including thermal conditions of the component within each of a plurality of build layers;

dividing the processing history model of the component geometry into a first region characterized by a first range of input data, and a second region characterized by a second range of input data, wherein the first and second ranges of input data are non-overlapping; and using the first range of input data by an additive manufacturing machine processing routine using a first set of processing parameters to fabricate a first test specimen that has a processing history that includes thermal condition data within the first range of input data, and using the second range of input data by an additive manufacturing machine processing routine using a second set of processing parameters to fabricate a second test specimen that has a processing history that includes thermal condition data within the second range of input data, wherein the first set of processing parameters is different than the second set of processing parameters;

wherein the additive manufacturing processing parameters comprise laser power, laser speed, hatch distance, layer thickness, beam offset, and beam focus; and wherein processing metrics are derived from the in-situ sensor data or from a computational model of an additive manufacturing process of the component.

11. The additive manufacturing system of claim 10, wherein in-situ sensor data comprises sensor signals detected across a component geometry for each of a plurality of build layers.

12. The additive manufacturing system of claim 10, wherein input data of the first region indicate a hot region relative to other regions of the component.

13. The additive manufacturing system of claim 10, wherein input data of the second region indicate a cool region relative to other regions of the component.

* * * * *